Patented Oct. 9, 1945

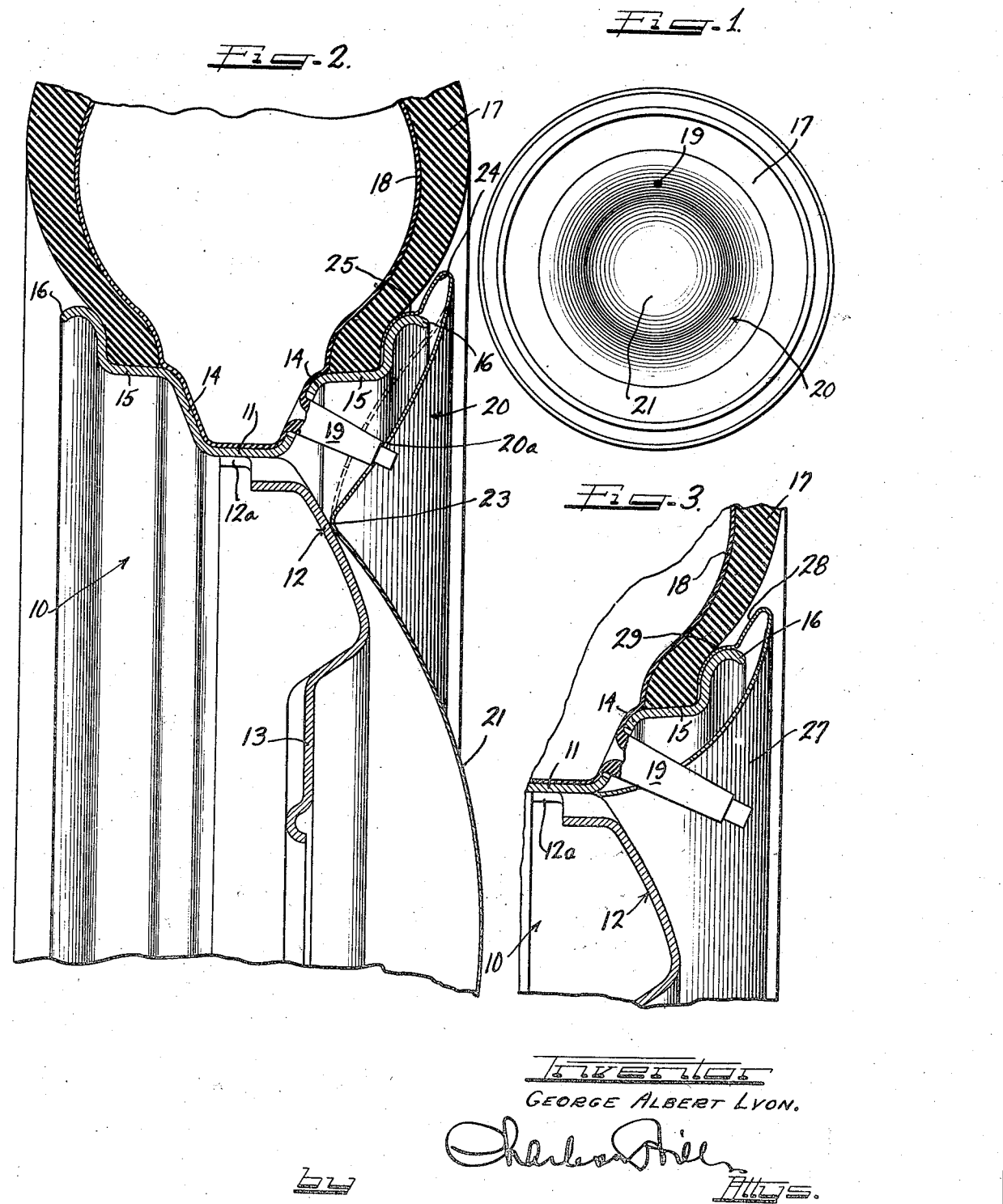

2,386,240

UNITED STATES PATENT OFFICE 2,386,240

WHEEL STRUCTURE

George Albert Lyon, Allenhurst, N. J.

Application September 6, 1943, Serial No. 501,344

10 Claims. (Cl. 301—37)

This invention is directed to an improved wheel structure and relates more particularly to an improved cover assembly therefor.

It is an important object of the present invention to provide an improved retaining arrangement for maintaining a cover in detachable engagement over the outer side of a wheel structure.

Still another object of the invention is to provide, for disposition over the outer side of a wheel structure, a cover assembly including a radially outer annular part constructed from synthetic plastic sheet material or the like and having physical characteristics enabling it to be self-supporting as to form, yet locally, resiliently, temporarily distortible whereby, when distorting pressures are removed therefrom, it snaps back immediately to its original configuration, said cover member being formed at a radially outer part thereof for retaining engagement with a flange of a flanged tire rim and arranged in such a manner that it is normally maintained in such a position that upon being engaged accidentally by curbing or the like, it may move axially inwardly freely to withstand destructive stresses imposed by said accidental abutment.

It is still another object of the invention to provide for disposition over the outer side of a wheel structure a cover assembly including a radially outer annular portion constructed from sheet synthetic plastic material or the like, and having physical characteristics enabling it to be self-sustaining as to form and yet resiliently, locally, temporarily flexible, said cover member having a radial cross-sectional configuration of such form and magnitude that it extends from beyond the junction between a tire rim of a wheel over which it is disposed and a tire therein, radially inwardly to a point radially inwardly of the tire rim and so that it substantially simulates the configuration of the adjacent side wall of the tire, thereby to give the appearance of being a part thereof and to give the appearance of being a massive white sidewall thereof when colored white, said cover having a radially outer part thereof arranged to detachably engage with a part of the tire rim to secure the cover on the wheel.

It is a further object of the invention to provide for a wheel structure including a flanged tire rim and a central load bearing portion, a cover member constructed from sheet synthetic plastic material and having characteristics enabling it to be temporarily, locally flexed and yet self-supporting as to form, whereby it immediately snaps back into its initial position after the distorting stresses are removed therefrom, said cover having a radially outer part arranged to extend radially outwardly beyond the edge portion of the tire rim to conceal the junction between the same and a tire therein and having a bent back portion at the radially outer edge thereof for engaging with the radially outer face of a flange of the tire rim to which it is secured, the portion of the cover extending beyond the edge portion of the tire rim being spaced axially outwardly therefrom whereby to afford yielding movement thereof axially inwardly to resist breakage when the wheel to which it is secured is driven against an obstruction such as curbing or the like.

It is still a further object of the invention to provide for disposition over the outer side of a wheel structure, a circular cover member including a radially outer annular portion and an integral central circular hub cap simulating portion, said cover being constructed from synthetic plastic sheet material or the like, having physical characteristics enabling it to be locally, resiliently, flexed and being further provided at the radially outer part thereof with means for disposition in sandwiched relationship between the tire rim and a tire therein to secure the cover over the outer side of the wheel structure.

In accordance with the general features of the invention, there is provided herein a cover member for disposition over the outer side of a wheel structure having a drop center type tire rim and a central load bearing portion, said cover having a radially outer annular portion formed from sheet synthetic plastic material or the like, and having the radially outer margin thereof turned back upon itself at a point radially outwardly beyond the radial outward extremity of the tire rim over which it is disposed, said bent back portion being arranged to retainingly engage with the axially inner surface of the edge portion of the tire rim at a part thereof against which the bead of a tire therein normally bears and the portion of said cover in axial alignment with the edge portion of the tire rim being spaced axially outwardly therefrom to afford yielding movement of the cover at that point axially inwardly upon striking an abutment such as curbing or the like, said annular cover part, if desired, being provided with an integral central circular hub cap simulating member.

Other objects and advantages of the invention will become apparent from the following description and accompanying drawing in which:

Figure 1 is a side elevation of a wheel structure embodying my invention;

Figure 2 is a fragmentary radial cross-sectional view of a wheel structure such as that shown in Figure 1; and Figure 3 is a fragmentary radial cross-sectional view of a wheel structure embodying a slightly modified form of my invention.

It is to be understood that the embodiments shown herein may be changed or modified without departing from the spirit and scope of the invention as set forth in the appended claims.

As best shown in Figures 2 and 3, a typical drop center type wheel structure with which my improved cover may be associated includes a tire rim of the drop center type having a base flange 11 which may be secured to a central load bearing portion by means of welding or riveting or the like to an axially inwardly extending flange 12a formed at the radially outer margin of the central load bearing portion 12. If desired, the flange 12a may at circumferentially spaced parts be radially inwardly depressed to form circumferentially spaced, circularly disposed apertures through the wheel structure.

The central load bearing portion 12 is further provided at a radially inner part thereof with a bolt-on flange 13 which may be utilized for the purpose of securing the wheel structure to an appropriate part of the vehicle with which it is associated such as, for instance, the brake drum thereof.

The drop center type tire rim 10 is further provided with opposite side wall flanges 14, opposite intermediate flanges 15 and opposite edge portions 16 between which may be disposed the radially inner parts of a tire 17 having an inner tube 18 provided with a valve stem 19 that is arranged for alignment with and to extend through a suitable aperture in the adjacent side wall flange 14.

The cover shown in Figure 2 includes two integral portions, namely, the radially outer annular portion 20 and the central circular hub cap simulating portion 21. These cover portions are formed by any suitable process from sheet synthetic plastic material and have physical characteristics enabling them to be self-supporting as to form, yet locally, resiliently flexible whereby they immediately snap back to the initial configuration shown in solid lines immediately upon the release of distorting pressures therefrom.

It will be seen that the central circular cover portion 21 is provided with a crowned configuration, while the radially outer annular part 20 substantially simulates the curvature of the adjacent side wall of the tire 17 to give the appearance of being a continuation thereof and to appear as a part thereof and furthermore to appear as a white side wall of a massive tire on a wheel structure of minimum dimensions, when colored white. It will also be seen that the annular cover part 20 is provided with a cross-sectional magnitude whereby it extends radially inwardly from a point beyond the junction between the tire and the edge portion 16 of the tire rim to a point on the central load bearing portion 12 which is disposed radially inwardly of the junction between the same and the tire rim 10. Thus it will be seen that a smooth continuous outer cover structure is provided for the wheel to conceal the irregularities ordinarily afforded by the junction between the edge portion 16 of the tire and the outer surfaces of the flanges of the tire rim together with the junction between the tire rim 10 and the central load bearing portion 12.

Preferably the junction between the cover portions 20 and 21 comprises a rounded, axially inwardly extending corner junction 23 which presents a smooth, neat, axially outer appearance and which also serves as a bearing, supporting point for the cover on the wheel structure and serves as an intermediate strengthening instrumentality for the entire cover.

To the end that the cover assembly may be efficiently secured to the wheel structure, the cover portion 20 extends radially outwardly, as previously indicated, beyond the edge portion 16 of the tire rim 10, there being also provided a bent back flange 24 which extends radially inwardly behind the outer marginal portion of the exposed part of the cover member 20, this flange 24 terminating in a curvate section 25 which is preferably configurated to overlie the adjacent portion of the surface of the edge portion 16 of the tire rim to be disposed between the same and the tire 17 to provide secure anchorage therefor. If desired, the portion 25 of the cover may be split to facilitate assembly thereof over the edge portion 16.

It will be noted that the radially outer part of the exposed portion of the cover member 20 is preferably spaced from the periphery of the edge portion 16 of the wheel to provide certain advantages to be explained presently.

In applying the cover assembly to the wheel structure, the tire is first applied to the rim and the cover assembly is then aligned concentrically with the wheel and the flange 25 is extended radially outwardly and then progressively disposed behind the edge portion 16 of the tire rim into sandwiched engagement between the same and the tire as shown in Figure 2.

The cover portion 20 is preferably provided with an aperture 20a through which the tip of the valve stem 19 may project. To inflate the tire, it is merely necessary for the operator to flex the locally, temporarily resilient cover member 20 generally axially inwardly into the dotted line position shown in Figure 2, whereupon the entire outer end of the valve stem is accessible so that the nozzle of an air hose may be applied thereto. After the inflation operation has been completed, removal of the nozzle will permit the cover to flex inherently into the position shown in dotted lines in Figure 2.

As indicated previously, the cover member 20 is spaced at the radially outer margin thereof from the edge of the edge portion 16 of the tire rim 10, thus in the event of accidental, axially inward movement of the radially outer portion of the cover member 20, the body thereof may move axially inwardly freely and resiliently toward the edge portion 16 a considerable distance before engaging the same, this movement involving inherent flexure of the generally axially outwardly exposed portion of the member 20 and the radially outward junction between the same and the turned back flange 24. Thus it will be seen that the radially outer part of the cover member 20 is arranged for free, yieldable movement relative to the edge portion of the tire rim 10 and yet is securely maintained thereon by means of a yieldable connection constituting the flanges 24 and 25. This yieldability is found to protect the radially outer margin of the cover assembly from damage due to the imposition of undue strains thereon when an abutment such as the curbing is engaged. This protection is augmented by the fact that, as shown in Figure 2, the laterally outermost part of the side wall of the tire 17 is disposed axially outwardly of the cover 20. Thus, when the vehicle is driven against the curb, the side wall of the tire first scrapes to warn the driver that the abutment is engaged whereupon the driver, under ordinary circumstances, immediately turns the vehicle to avoid the abutment, whereby only a minimum engagement of the cover member is obtained. Under such circumstances it will be seen that this minimum engagement is accompanied by inward springing of the radially outer portion of the cover which is the vulnerable part most subject to damage.

From the foregoing it will be seen that there is provided herein for a wheel structure a cover assembly which is constructed entirely from synthetic plastic material or the like, and thus it will be seen that the unsprung weight of the vehicle with which it is associated is greatly reduced, it being found that such a cover weighs in the vicinity of only one-third as much as metallic covers heretofore used.

In the embodiment shown in Figure 3, the wheel and cover construction is substantially similar to that shown and described in connection with Figure 2, however, this modification embodies the adaptation of my invention to a cover member which is in the form of an annular trim ring having a central aperture therein. In this construction the cover member 27 is likewise provided with an axially inwardly, radially extending flange 28 at the outer periphery thereof and a curvate flange 29 arranged to extend over the rear surface of the edge portion 16 of the tire rim 10 and in sandwiched relation between the same and the tire 17.

The cover of Figure 3 is also preferably formed from sheet synthetic plastic material or the like, and thus has the attributes set forth in connection with the construction of Figure 2. In this modification, however, the cover member 27 extends radially inwardly to a point adjacent the junction between the tire rim and the central load bearing portion 12 whereby the cover 27 is securely seated in the corner formed between the axially outer part of the base flange 11 of the tire rim 10 and the axially outer part of the flange 12a of the central load bearing portion 12. With this construction it will be seen that the circumferentially spaced wheel openings formed by the depressed portions of the flange 12a will be entirely disposed to afford efficient ventilation of the vehicle parts housed behind the central load bearing portion 12.

As is well known, in the automotive field certain wheel structures are such that a free circulation of air through the wheel openings is desired; while in other vehicle constructions it is highly desirable that the wheel openings be present for circulation of air to a limited extent but that some means be provided for preventing the ingress of gravel, dirt and the like therethrough from the outside. In accordance with the invention disclosed herein, it will be seen that the construction of Figure 2 is admirably adapted to prevent the ingress of gravel and dirt, while the construction of Figure 3 leaves the wheel openings exposed thereby to facilitate the circulation of air therethrough to cool the brake drum and the like.

What I claim is:

1. In a cover structure for a wheel having a multi-flange tire rim and a central load bearing portion, a cover including a radially outer annular portion formed from sheet material and having physical characteristics enabling it to be resiliently flexed temporarily, locally and to return to its original configuration when flexing pressure is relieved therefrom, said annular cover portion being arranged to extend radially outwardly beyond the junction of the tire rim and a tire therein and having a turned back flange formed to extend generally radially inwardly and to retainingly engage a portion of the inner surface of the flanged tire rim.

2. In a wheel structure having a multi-flange tire rim and a central load bearing portion, a cover assembly including a radially outer annular part formed from synthetic plastic material and having physical characteristics enabling it to be flexed locally, temporarily and to spring back to its initial configuration when flexing pressures are relieved therefrom, said annular cover portion being arranged for disposition over the outer side of the tire rim and in axially outwardly spaced relation to the axially outer edge thereof and radially outwardly thereover beyond the junction of the tire rim and the tire therein to conceal the junction between the rim and the tire therein and also having a portion at the radially outer part thereof turned back axially inwardly to extend radially inwardly into retaining engagement between the inner surface of the rim and the side of a tire therein, thereby to be springable axially inwardly toward the adjacent portion of the rim at the radially outer part thereof when engaged against curbing or the like.

3. In a wheel structure having a multi-flange tire rim and a central load bearing portion, a cover assembly including a radially outer annular part formed from synthetic plastic material and having physical characteristics enabling it to be flexed locally, temporarily and to spring back to its initial configuration when flexing pressures are relieved therefrom, said annular cover portion being arranged for disposition over the outer side of the tire rim and to extend radially outwardly thereover beyond the junction of the tire rim and the tire therein to conceal the junction between the rim and a tire therein and also having a portion at the radially outer part thereof turned back axially inwardly to extend radially inwardly into retaining engagement between the inner surface of the rim and the side of a tire therein.

4. In a wheel structure having a tire rim and a central load bearing portion, a cover assembly formed from synthetic plastic material and having physical characteristics enabling it to be self-supporting as to form and yet locally, resiliently flexible whereby it returns to its initial configuration upon the release of flexing pressures therefrom, said cover assembly including a disk arranged for disposition over the outer side of the wheel structure, said disk including a central hub cap simulating portion and a radially outer annular portion having a cross-sectional configuration of such shape as to simulate the side wall of a tire in the tire rim to give the appearance of being a continuation thereof, said radially outer annular portion also having a cross-sectional magnitude so as to extend over the outer side of the tire rim and radially outwardly beyond the radially outer extremity thereof to conceal the junction between the rim and a tire therein and having a radially outer marginal portion thereof bent back axially inwardly to extend generally radially inwardly into retaining engagement with a portion of the inner surface of the tire rim whereby the cover assembly is securely maintained thereon.

5. In a wheel structure having a tire rim and a central load bearing portion, a cover assembly formed from synthetic plastic material and having physical characteristics enabling it to be self-supporting as to form and yet locally, resiliently flexible whereby it returns to its initial configuration upon the release of flexing pressures therefrom, said cover assembly including a disk arranged for disposition over the outer side of a wheel structure, said disk including a central hub cap simulating portion and a radially outer annular portion having a cross-sectional configuration of such shape as to simulate the side wall of a tire in the tire rim to give the appearance of being a continuation thereof, said radially outer annular portion also having a cross-sectional magnitude so as to extend over the outer side of the tire rim and radially outwardly beyond the radially outer extremity thereof to conceal the junction between the rim and a tire therein and having a radially outer marginal portion thereof bent back axially inwardly to extend generally radially inwardly into retaining engagement with a portion of the inner surface of the tire rim whereby the cover assembly is securely maintained thereon, said cover assembly having an intermediate annular portion at the junction of said radially outer cover portion and the central hub cap simulating portion, said annular portion comprising an axially inwardly extending section arranged for supporting abutment with the adjacent portion of the outer surface of the wheel structure to support the intermediate section of the cover assembly.

6. In a cover structure for a wheel having a multi-flanged tire rim provided with an edge portion and a central load bearing part, a cover including a radially outer annular portion for disposition over exposed outer side flanges of the rim and being arranged to extend radially outwardly beyond the extremity of the edge portion of the tire rim and having a turned back flange formed to extend generally radially inwardly and into retaining engagement with a portion of the inner surface of the flanged tire rim.

7. In a wheel structure having a multi-flanged tire rim provided with an edge portion and a central load bearing part, a cover assembly including a radially outer annular portion formed from synthetic plastic material and having physical characteristics enabling it to be resiliently flexed temporarily, locally and to return to its original configuration when flexing pressure is relieved therefrom, said annular cover portion being arranged to extend radially outwardly beyond the extremity of the edge portion of the tire rim, having a turned back flange formed to extend generally radially inwardly and into retaining engagement with a portion of the inner surface of the flanged tire rim, and having a radially inner marginal portion arranged to extend generally axially inwardly, and into abutting, supporting engagement with the adjacent portion of the outer surface of the wheel structure.

8. In a wheel structure having a multi-flanged tire rim provided with an edge portion and a central load bearing part, a cover assembly including a radially outer annular portion formed from synthetic plastic material and having physical characteristics enabling it to be resiliently flexed temporarily, locally and to return to its original configuration when flexing pressure is relieved therefrom, said annular cover portion being arranged to extend radially outwardly beyond the extremity of the edge portion of the tire rim and having a turned back flange formed to extend generally radially inwardly and into retaining engagement with a portion of the inner surface of the flange tire rim, said tire rim and central load bearing part being joined together to provide on the outer surface of the wheel structure, at the junction of said parts, a generally axially inwardly extending recess, said cover being provided with a generally axially inwardly extending portion at the radially inner part thereof arranged for disposition in said recess to supportingly engage the cover member.

9. In a wheel structure having a multi-flanged tire rim provided with an edge portion and a central load bearing part, a cover assembly including a radially outer annular portion formed from synthetic plastic material and having physical characteristics enabling it to be resiliently flexed temporarily, locally and to return to its original configuration when flexing pressure is relieved therefrom, said annular cover portion being arranged to extend radially outwardly beyond the extremity of the edge portion of the tire rim and having a turned back flange formed to extend generally radially inwardly and into retaining engagement with a portion of a surface of the flanged tire rim.

10. In a wheel structure having a tire rim and a central load bearing portion, a cover assembly formed from synthetic plastic material and having physical characteristics enabling it to be self-supporting as to form and yet locally, resiliently flexible whereby it returns to its initial configuration upon the release of flexing pressures therefrom, said cover assembly including a disk arranged for disposition over the outer side of the wheel structure, said disk including a central hub cap simulating portion and an integral, radially outer annular portion having a cross-sectional configuration of such shape as to simulate the side wall of a tire in the tire rim to give the appearance of being a continuation thereof, said radially outer annular portion also having a cross-sectional magnitude so as to extend over the outer side of the tire rim and radially outwardly beyond the radially outer extremity thereof to conceal the junction between the tire rim and a tire therein and having a radially outer marginal portion thereof bent back axially inwardly to extend generally radially inwardly into retaining engagement with a portion of the inner surface of the tire rim whereby the cover is securely maintained thereon, the junction between said hub cap simulating cover portion and said annular cover portion comprising an annular, generally inwardly extending bead arranged to supportingly bear against the adjacent portion of the outer surface of the wheel structure when said cover assembly is mounted thereon, thereby to support the intermediate portion of the cover assembly.

GEORGE ALBERT LYON.